United States Patent [19]

Ishitobi

[11] Patent Number: 4,990,837
[45] Date of Patent: Feb. 5, 1991

[54] DYNAMIC BRAKING APPARATUS FOR A MOTOR

[75] Inventor: Chikato Ishitobi, Amagasaki, Japan

[73] Assignee: Mitsubishi Denki Kabushiki Kaisha, Japan

[21] Appl. No.: 427,953

[22] Filed: Oct. 25, 1989

Related U.S. Application Data

[63] Continuation of Ser. No. 21,490, Mar. 4, 1987, abandoned.

[30] Foreign Application Priority Data

Jun. 3, 1986 [JP] Japan .................................. 61-48939

[51] Int. Cl.$^5$ ............................................. H02P 3/12
[52] U.S. Cl. .................... 318/375; 318/254; 318/379; 318/759
[58] Field of Search ............... 318/138, 254, 370, 371, 318/373, 375, 379, 380, 439, 703, 744, 757, 759, 760

[56] References Cited

U.S. PATENT DOCUMENTS

| 3,153,182 | 10/1964 | Choudhury | 318/759 |
|---|---|---|---|
| 4,311,948 | 1/1982 | Brown et al. | 318/757 X |
| 4,393,344 | 7/1983 | Whellams | 318/759 |
| 4,417,288 | 11/1983 | Hattori et al. | 318/371 X |
| 4,426,606 | 1/1984 | Suita et al. | 318/375 |
| 4,455,515 | 6/1984 | Uzuka | 318/254 |
| 4,494,056 | 1/1985 | Nishijima et al. | 318/375 X |
| 4,518,902 | 5/1985 | Melocik et al. | 318/373 |
| 4,568,862 | 2/1986 | Tassinario | 318/254 |

FOREIGN PATENT DOCUMENTS

| 56-22254 | 3/1981 | Japan . | |
|---|---|---|---|
| 56-133992 | 10/1981 | Japan | 318/703 |
| 57-75597 | 5/1982 | Japan | 318/254 |
| 57-80296 | 5/1982 | Japan | 318/254 |
| 57-148585 | 9/1982 | Japan | 318/373 |
| 58-15481 | 1/1983 | Japan | 318/254 |
| 59-37877 | 3/1984 | Japan | 318/254 |
| 61-76084 | 4/1986 | Japan | 318/254 |

Primary Examiner—Bentsu Ro
Attorney, Agent, or Firm—Leydig, Voit & Mayer

[57] ABSTRACT

A control apparatus for a motor including m number of stator windings and a relay having m−1 contacts, thereby allowing the control apparatus to be simplified in its structure so that the control apparatus can be constructed at a low cost.

3 Claims, 2 Drawing Sheets

DYNAMIC BRAKING APPARATUS FOR A MOTOR

This application is a continuation of application serial No. 07/021,490, filed March 4, 1987, now abandoned.

BACKGROUND OF THE INVENTION

The present invention relates to a control apparatus for a motor.

FIG. 1 is a circuit diagram of an example of a conventional control apparatus for a motor.

Such an apparatus is disclosed in Japanese Patent Application Laid Open No. 56-22254.

The conventional control apparatus comprises stator windings 1a, 1b and 1c of a motor, transistors 2a, 2b and 2c connected in series with the corresponding windings 1a, 1b and 1c, and a control circuit 3 for detecting the number of revolutions of the motor to control the transistors 2a, 2b and 2c in accordance with the detected number of revolutions of the motor. The stator windings 1a, 1b and 1c, the transistors 2a, 2b and 2c, and the control circuit 3 together constitute a motor unit 5.

The control apparatus further comprises a first relay 6, which has changeover contacts 7a, 7b and 7c connected in series with the corresponding stator windings 1a, 1b and 1c, for selectively changing the connection of the windings 1a, 1b and 1c in such a manner that electric power having a voltage +B is supplied to the stator windings 1a, 1b, and 1c and that the motor unit 5 is operated in a dynamic braking mode, a switch 8 for actuating the relay 6, a second relay 9, having changeover contacts 10a, 10b and 10c, connected in series with the corresponding stator windings 1a, 1b and 1c of the motor unit 5, control resistors 11a, 11b and 11c being connectable in series with the stator windings 1a, 1b and 1c when the motor unit 5 is operated in the dynamic braking mode, a power rectifying circuit 12, which is composed of capacitors 13a, 13b, diodes 14a, 14b, 14c, a variable resistor 15a and a resistor 15b for supplying a regenerative electric power to the relay 9 when the motor unit is operated in the dynamic braking mode.

When the switch 8 is turned ON, the first relay 6 is energized so as to connect the contacts 7a, 7b and 7c to the contacts 16a, 16b and 16c, whereby electric power having a voltage +B is applied to each of the stator windings 1a, 1b and 1c, whereby each phase of the respective windings is controlled so that the motor begins rotating. During this time, the power rectifying circuit 12 supplies a power to the relay 9, and the variable resistor 15a is adjusted such that the rectifying circuit 12 supplies a sufficiently large current to energize the second relay 9.

When the switch 8 is turned OFF, the first relay 6 is de-energized so as to connect the contacts 7a 7b and 7c of the relay 6 to the contacts 8a, 8b and 8c and the motor unit 5 is used as a dynamic generator. During this time, the second relay 9 is energized so as to connect the contacts 10a, 10b and 10c to the resistors 11a, 11b and 11c, thereby establishing a short-circuit in the respective stator windings 1a, 1b and 1c. When the voltage across the terminals of the second relay 9 becomes below a predetermined value, the second relay 9 is de-energized so that the contacts 10a, 10b and 10c are contacted to the contacts 17a, 17b and 17c, thereby establishing a complete short-circuit in the respective stator windings 1a, 1b and 1c, whereby the motor unit 5 is quickly stopped.

The thus constructed conventional control apparatus for a motor has problems in that the control apparatus needs changeover contacts equal in number to the number of the stator windings or more, thereby causing the apparatus to be complicated, encumbrant and expensive.

SUMMARY OF THE INVENTION

According to the present invention, a control apparatus for a motor having m stator windings (where m is an integer greater than 1) may comprise a power source, a first switch, a control circuit, and a second switch. The power source provides power and the first switch alternatively applies or removes power. The control circuit is coupled between the power source and the m stator windings for controlling the application of power to the m stator windings. The second switch is coupled between the control circuit and (m−1) of the m stator windings. The other stator winding is coupled to the control circuit independently of the second switch. The second switch includes (m−1) switch contacts respectively connected in series with the (m−1) stator windings. These contacts are responsive to the first switch. When the first switch applies power, the (m−1) switch contacts move to a first position connecting the control circuit to the (m−1) stator windings and supplying power between the control circuit and the (m−1) stator windings. When the first switch removes power, the (m−1) switch contacts move to a second position connecting the (m−1) stator windings to the other stator winding and to each other. This short circuits the m stator windings to each other and switches the motor into a dynamic braking mode.

BRIEF DESCRIPTION OF THE DRAWINGS

The present invention will become more readily apparent from the following detailed description of the preferred embodiments of the present invention taken in conjunction with the accompanying drawings, in which.

DETAILED DESCRIPTION OF THE PREFERRED EMBODIMENTS

Figure 1:
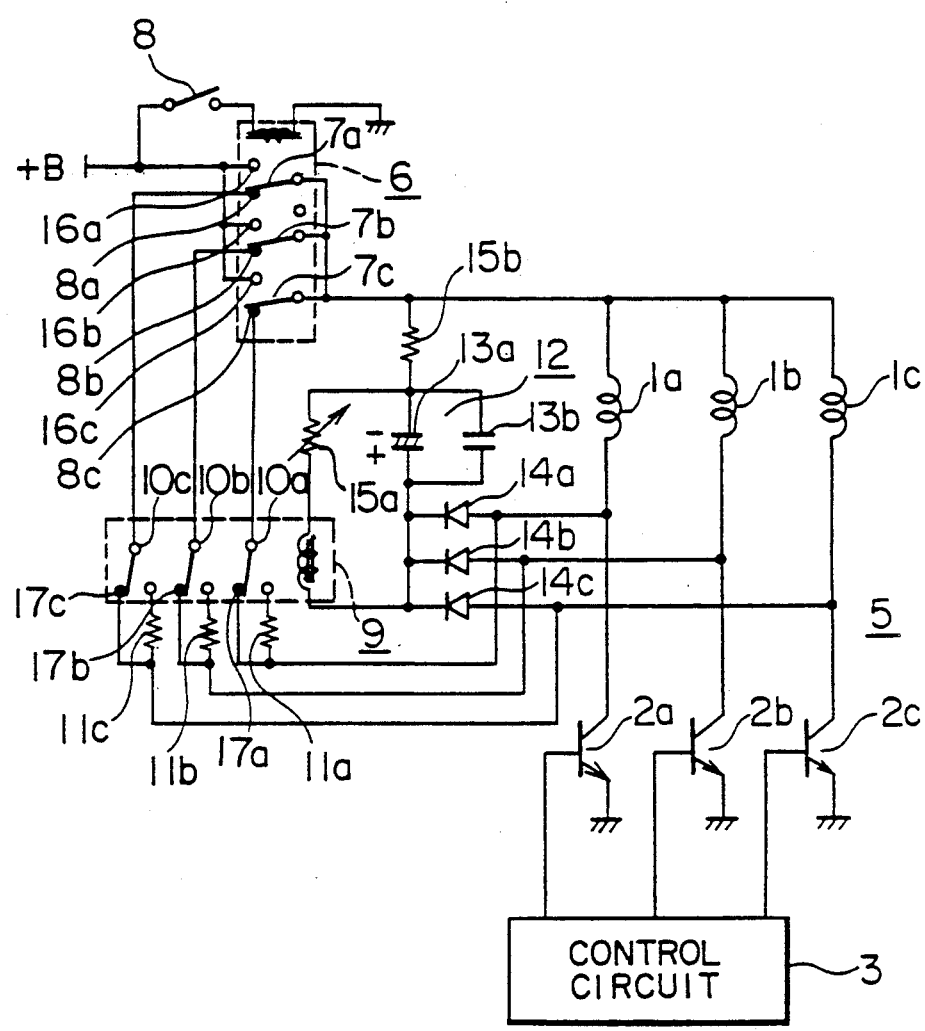
FIG. 1 is a circuit diagram of a conventional control apparatus for a motor.
Figure 2:
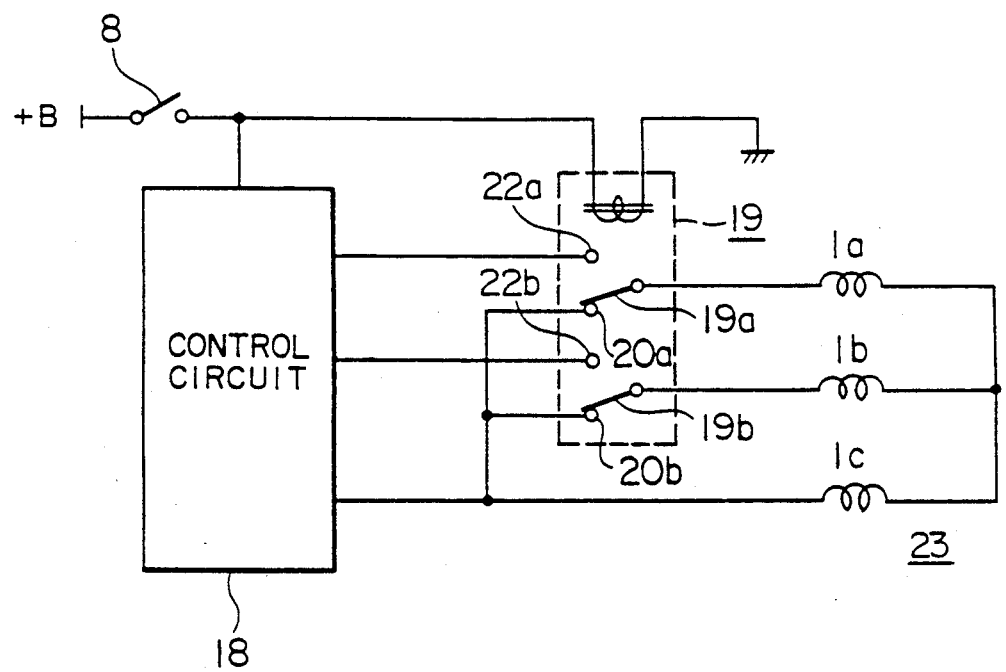
FIG. 2 is a circuit diagram of a control apparatus for a motor according to one embodiment of the present invention.

Referring now to FIG. 2 in which the control apparatus of the present invention is applied to a disc drive apparatus, the control apparatus for a motor for controlling three motor stator windings 1a, 1b and 1c comprises a control circuit 18 for controlling the amount of electric power supplied to the stator windings 1a, 1b and 1c, and a relay 19 comprising changeover contacts 19a, 19b connected in series with the stator windings 1a and 1b. These changeover contacts 19a and 19b are connected to the contacts 22a and 22b, when the relay 19 is energized and they are connected to the contacts 20a and 20b, when the relay 19 is de-energized. The control circuit 18 may be a monolythic power integrated circuit sold by Hitachi under the trade name of HA13426.

In the thus constructed control apparatus for a motor, when the switch 8 is turned ON, the relay 19 is energized so as to connect the changeover contacts 19a and 19b to the contacts 22a and 22b, so that electric power is supplied to the stator windings 1a, 1b and 1c, through the control circuit 18. The motor begins rotating accordingly under the control of the control circuit 18.

Now, when the switch 8 is turned OFF, the control circuit 18 is disconnected from the electric power to thereby stop controlling the stator windings 1a, 1b and 1c and the relay 19 is de-energized so as to connect the changeover contacts 19a and 19b to the contacts 20a and 20b respectively, whereby the stator windings 1a, 1b and 1c are short-circuited so that the motor is operated in the dynamic braking mode and quickly stopped.

Figure 3:
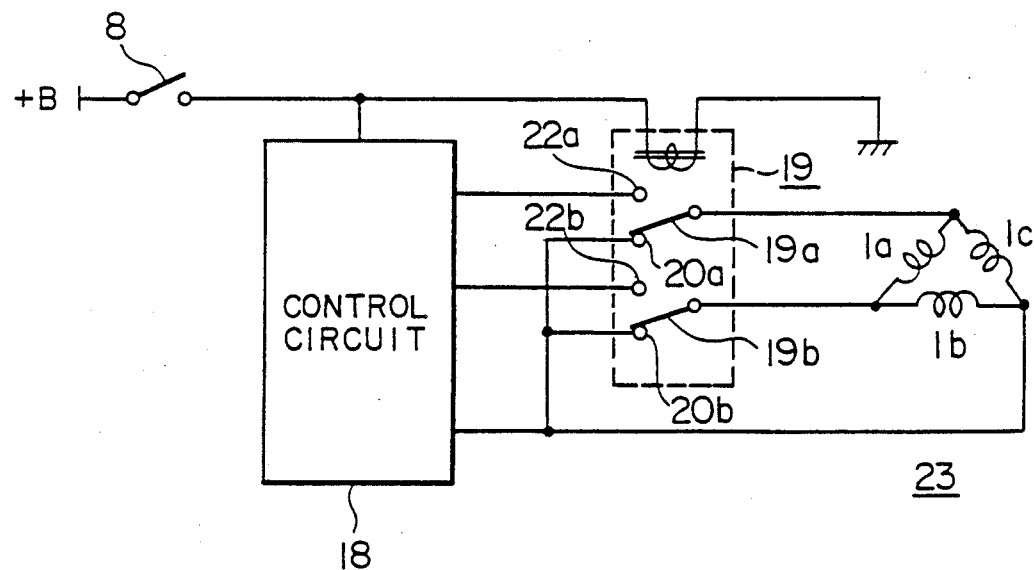
FIG. 3 is a circuit diagram of a control apparatus of another embodiment of the present invention.

While the above description has been made in terms of an electric motor having stator windings connected in the star-connection, the present invention is also applicable to a motor having stator windings connected in the delta-connection as shown in FIG. 3.

While the control apparatus for a three-phase-motor has been described as an example, it should be noted that the control apparatus of the present invention can be equally applied to a multi-phase motor having at leaset 2 phases and the number of contacts can be reduced by 1.

According to the present invention, the control apparatus for a motor having m number of stator windings comprises m−1 changeover contacts, thereby allowing the structure of the apparatus to be simplified and less encumbrant and making it possible to provide a low cost control apparatus.

What is claimed is:

1. A control apparatus for a motor having m stator windings where m is an integer greater than one, said control apparatus comprising:
   a power source for providing power;
   a first switch for alternatively applying or removing power;
   a control circuit coupled between the power source and the m stator windings for controlling the application of power to said m stator windings;
   a second switch coupled between the control circuit and (m−1) of said m stator windings, the other stator winding being coupled to the control circuit independently of the second switch, said second switch including (m−1) switch contacts respectively connected in series with said (m−1) stator windings and responsive to the first switch, said (m−1) switch contacts (1) moving to a first position connecting said control circuit to said (m−1) stator windings and supplying power between the control circuit and said (m−1) stator windings when the first switch applies power and (2) moving to a second position connecting said (m−1) stator windings to said other stator winding and to each other when the first switch removes power wherein each of said m stator windings are short circuited to each of the other m stator windings, thereby switching said motor into a dynamic braking mode.

2. A control apparatus as claimed in claim 1 wherein said motor is a disc drive motor.

3. A control apparatus as claimed in claim 2 wherein the number m of said stator windings is 3.

* * * * *